April 30, 1963 J. A. MAURER ET AL 3,087,401
FOCAL PLANE SHUTTER
Filed June 12, 1961 6 Sheets-Sheet 1

Inventors
John A. Maurer
Eugene W. Elliott
By Louis Berra
Attorney.

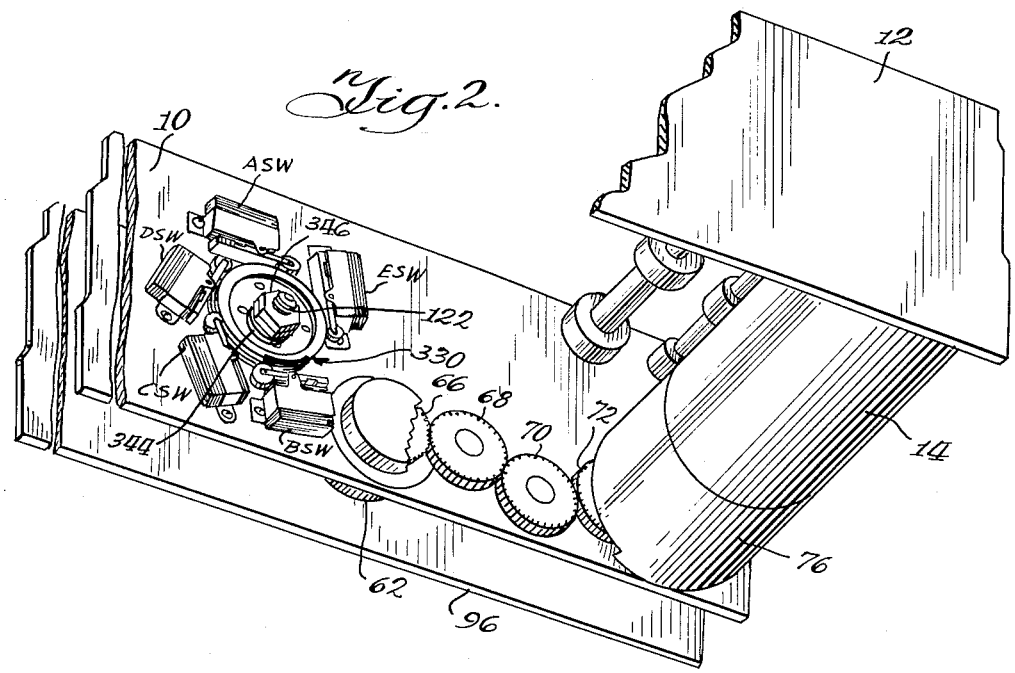

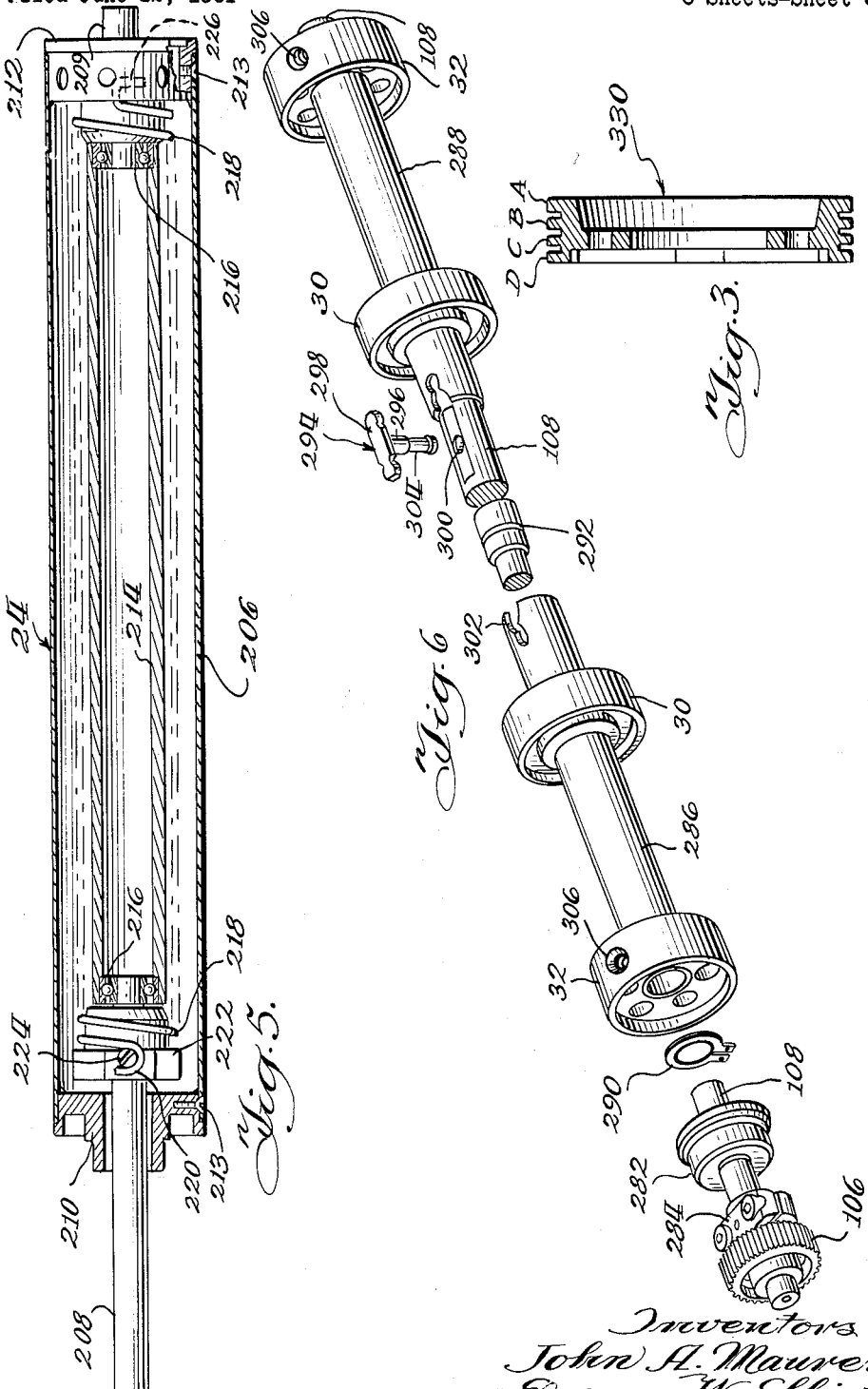

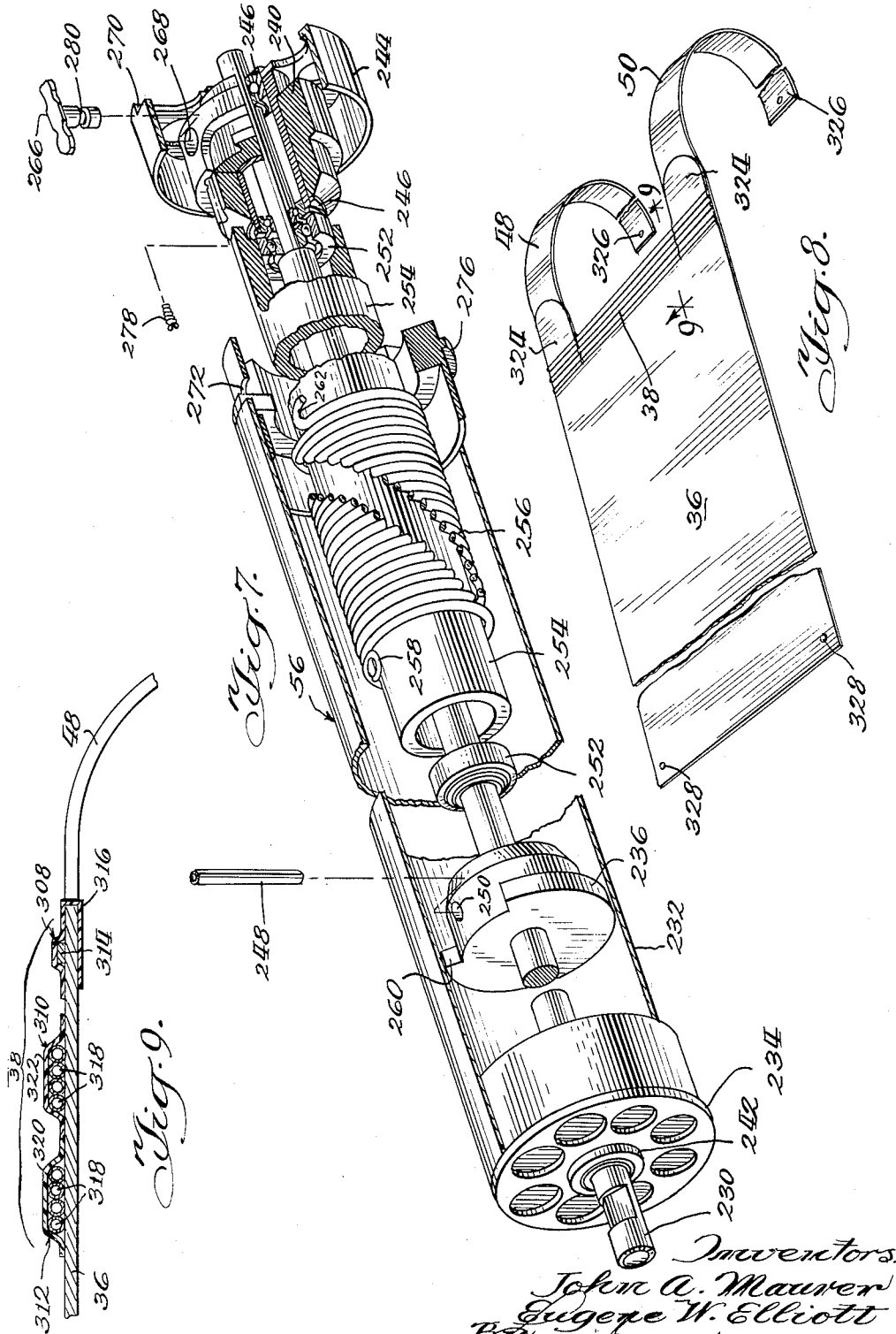

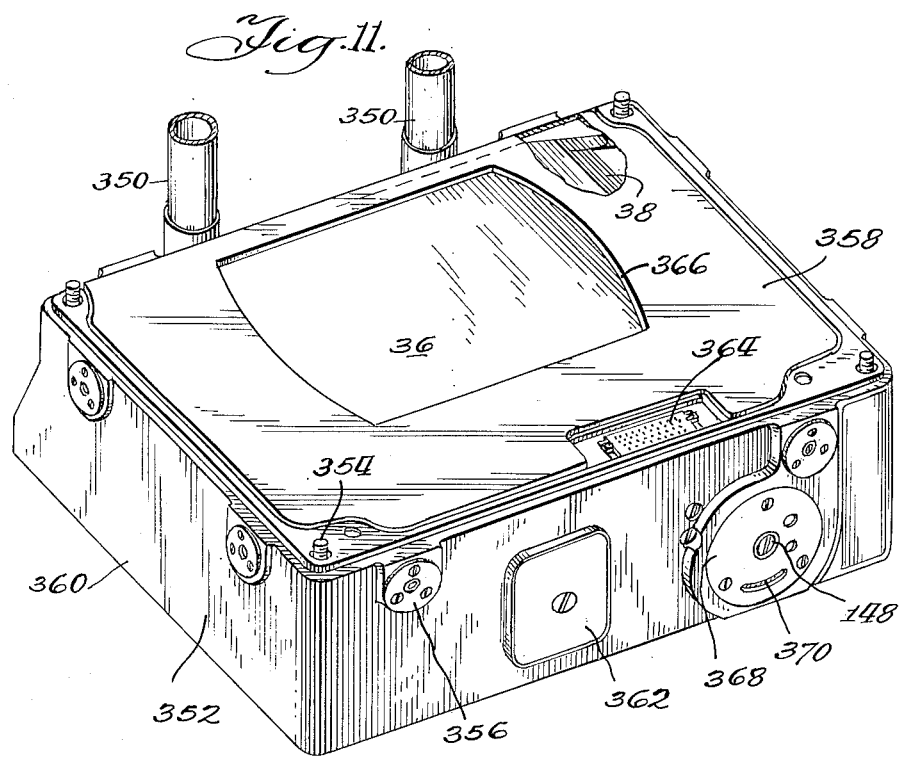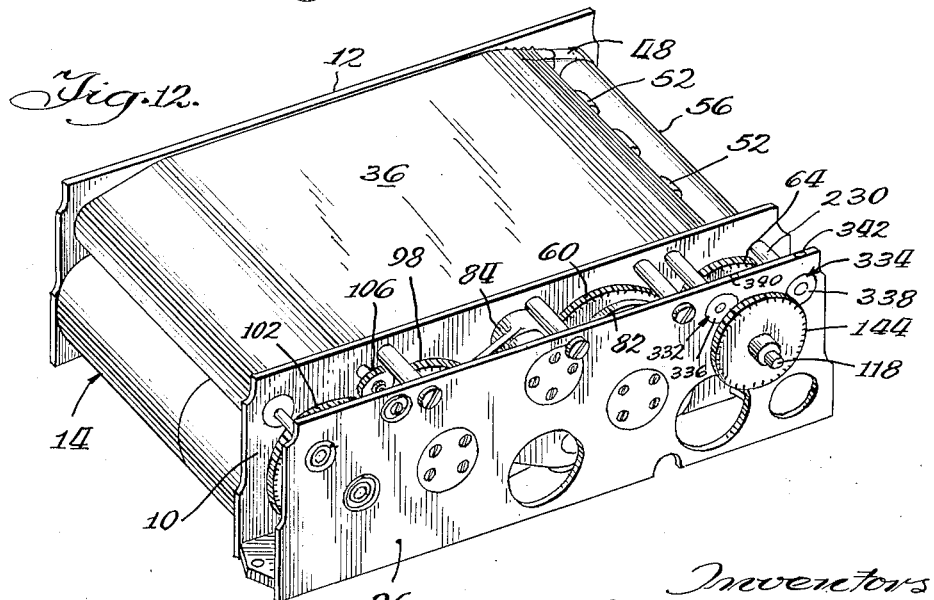

3,087,401
FOCAL PLANE SHUTTER
John A. Maurer, New Brunswick, N.J., and Eugene W. Elliott, Barrington, Ill., assignors to Chicago Aerial Industries, Inc., Barrington, Ill., a corporation of Delaware
Filed June 12, 1961, Ser. No. 113,992
16 Claims. (Cl. 95—57)

This invention relates generally to focal plane shutters of a type such as are used in aerial photography and more particularly to improvements in such a focal plane shutter. This invention is an improvement over the focal plane shutter disclosed in the co-pending application of John A. Maurer, Serial No. 115,958, filed June 9, 1961.

In common with many focal plane shutters previously used in aerial photography, the improved shutter of the present invention has two curtains. Each shutter curtain is comprised of a normally rectangular opaque or solid portion having a pair of spaced apart bands extending from one edge thereof and defining an open portion therebetween. The two shutter curtains are positioned in the shutter assembly with the open portion of one curtain juxtaposed with the open portion of the second curtain. A slit is formed between the juxtaposed edges of the solid portion of the first, or leading curtain and the solid portion of the second, or following curtain. The width of this slit, which is adjusted by varying the relative positions of the two curtains, is one of the two factors which control the duration of the exposure; the other factor being the velocity at which the curtains, and therefore the slit between their edges, are transported across the exposure area.

A cycle of operation of the shutter consists of a winding part, in which the two curtains are wound on rollers on one side of the exposure area so that the slit between the solid portions of both curtains is on this one side of the exposure area, and a run-down part during which the curtains and slit are carried across to rollers on the other side of the exposure area, thereby making the exposure. At the beginning of the winding part of the cycle, the leading curtain is moved first through a distance sufficient to close the slit between the two curtains so that no light can pass between them; this is called "capping" the shutter.

The winding of the shutter generally is done by engaging a drive motor through some form of clutch or coupling mechanism and when the curtains have been wound on their rollers in readiness for the run-down, the rollers are held by a latch while the winding mechanism is disconnected. This latch is later released to allow the curtains to run down to make the exposure, which they do under the impulsion of springs similar to the springs in an ordinary domestic roller blind, located in the rollers toward which the curtains move during the exposure.

In the prior art shutters of this type, the movement of the curtains during the run-down is controlled principally by the springs in the rollers on the "take-up" side of the system, and the curtains undergo acceleration throughout the entire run-down. The major part of this acceleration can be made to take place before the slit reaches the picture area, but nevertheless, it is very common for the curtains to receive enough further acceleration during the exposure of the picture to make the linear velocity as much as 50% greater at the end of the total exposure than at the beginning. If the slit width remains constant this means that one side of the picture receives only ⅔ as much exposure as the other. It is possible to compensate for this change of curtain velocity by arranging the mechanism so that the slit becomes wider during the travel of the slit across the picture area, but as a rule it is only possible to make this compensation perfect for one particular exposure setting of the shutter. Usually this must be done for the shortest exposure for which the shutter is designed; if the system is arranged to give perfect compensation at a lower shutter speed the compensation will be overdone when the shutter is set for the shortest exposure.

In spite of prior attempts to overcome this basic problem by the construction of special spring systems which give a strong impulse at the beginning of the run-down followed by a much weaker continuing force, all such prior art shutter are to some extent unsatisfactory in that they give non-uniform exposure over the picture area. This defect becomes more troublesome when attempts are made to give exposures of extremely short duration, such as 1/3000 or 1/4000 of a second for which it is necessary to achieve high curtain velocities and at the same time to employ relatively narrow slits.

The co-pending application above referred to attempts to overcome these prior art difficulties by the use of two rotating cams, each of which, through an appropriate cam follower and a gear train, controls the winding and the run-down of one of the shutter curtains. These cams are driven from the same power source so that they rotate in synchronism, but the driving system to the cam which controls the following curtain includes a differential mechanism by which this cam can be advanced or retarded with respect to the second cam, which controls the leading curtain. The rollers toward which the curtains move during the run-down, or exposure part of the cycle, contain strong springs which tend to pull the curtains toward them. The action of these strong curtain roller springs, transmitted through the curtains and the associated gear trains to the cam followers, is to press the cam followers firmly against the cams tending to accelerate the cams to a velocity beyond the controlled rate imposed by the drive motor.

The two cams are identical and are shaped to provide a smooth action corresponding to half of a sine wave function in the winding part of the cycle for each curtain, but the most important purpose they are intended to serve is to control the curtains during the run-down so that there is a period of constant rapid acceleration before the exposure is made, a period of constant velocity during which the exposure is made, and a period of smooth deceleration to a stop after the exposure is made.

If the two cams are placed in alignment and if the curtains at the same time are adjusted so that the edges of the leading and following shutter curtains just meet, rotation of the cams will cause the two curtains to move back and forth with no slit between them and no exposure will result. If then the differential mechanism is adjusted so as to retard the following curtain cam by an amount corresponding, for example, to 1/1000 of a second of rotation of the two cams, a slit will be opened up between the two curtains corresponding to 1/1000 of a second of movement of the curtains, and therefore the picture area will receive an exposure of 1/1000 of a second. A similar description setting forth certain parameters will explain any other exposure.

During the rewind part of any exposure cycle, the leading curtain cam remains in advance of the following curtain cam, so that as the curtains are rewound their edges are overlapped by the same amount as the width of the slit during the exposure. The capping of the shutter during the rewind is accomplished, therefore, without the need for any additional structural parts.

Accordingly, it is a general object of this invention to provide a new and improved focal plane shutter which overcomes the above recited and other difficulties of the prior art.

More particularly, it is an object of this invention to provide a new and improved focal plane shutter which is characterized by a unique motor-clutch-brake assembly which in conjunction with dual cams controls the operation of the shutter curtains.

It is another object of this invention to provide an improved focal plane shutter having a novel motor-clutch-brake assembly which provides relatively high cycle rates due to its ability to start and stop the shutter curtain movement more rapidly and more positively than heretofore possible.

It is still another object of the invention to provide an improved focal plane shutter having a novel motor-clutch-brake assembly which permits more accurate control over the starting and stopping positions of the shutter curtains.

It is still another object of this invention to provide an improved focal plane shutter having a novel motor-clutch-brake assembly which results in a shorter cam dwell between the run-down and rewind portions of the cycle to enable a wider exposure range than that provided by prior art devices.

It is a highly important object of this invention to provide an improved focal plane shutter having a novel motor-clutch-brake assembly which applies braking power to the cams to control curtain velocity during the run-down portion of the exposure cycle.

It is another important object of this invention to provide an improved focal plane shutter having a novel motor-clutch-brake assembly which permits the selective use of a variety of different motor types due to its ability to brake and declutch the shutter curtains from the motor until the motor reaches a desired speed or torque level.

It is a further object of this invention to provide an improved focal plane shutter having a novel self-damping cam assembly which permits a fixed exposure setting reference.

It is a still further object of this invention to provide an improved focal plane shutter having a novel self-damping cam assembly which accurately controls the shutter curtain slit width to maintain said slit width throughout the exposure cycle.

It is a still further object of this invention to provide an improved focal plane shutter having a novel self-damping cam assembly which permits the motor load to be picked up incrementally without adverse backlash effects, thereby enabling the use of smaller motor power units.

It is another object of this invention to provide an improved focal plane shutter having a novel universal coupling member for the band rollers of each shutter curtain which compensates for variations in the distances between the fastening points of the curtain on its rollers.

It is still another object of this invention to provide an improved focal plane shutter having a novel universal coupling member for the band rollers of each shutter curtain which facilitates uniform tracking of the shutter curtain across the exposure area.

It is still another object of this invention to provide an improved focal plane shutter having a novel universal coupling member for the band rollers of each shutter curtain which equalizes the tension on the shutter curtain bands to equalize the stresses thereon and thereby reduce stress concentration at certain points in the exposure cycle which otherwise could result in curtain failure.

It is a further object of this invention to provide an improved focal plane shutter having a pair of contra-rotating drive motors which serve to balance the forces and torques tending to adversely affect the stability of the camera.

It is a further object of this invention to provide an improved focal plane shutter having a pair of spaced apart contra-rotating drive motors positioned in the shutter assembly frame so as to enhance the structural rigidity of the shutter assembly.

It is a still further object of this invention to provide an improved focal plane shutter having novel means for reinforcing and adding additional strength to the slit defining edges of the shutter curtains.

It is still another object of this invention to provide an improved focal plane shutter having novel switching means responsive to the rotation of the cams for controlling the electrical circuits which actuate the motor-clutch-brake assemblies to apply or cut off power at desired times in the operating cycle and to generate signals for controlling the feeding of film in the associated camera.

It is another object of this invention to provide a new and improved focal plane shutter which is adapted for use in night photography with both electronic flash and pyrotechnic flares.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawings in which:

FIGURE 2 is a partially perspective view illustrating the gear train and electrical switching control apparatus of the embodiment shown in FIGURE 1;

FIGURE 3 is a cross-sectional view of the plural cam ring assembly shown in FIGURE 2;

FIGURE 4 is an exploded and partially broken view illustrating one of the motor and clutch-brake assemblies utilized in the invention;

FIGURE 5 is an elevational view in cross-section showing the construction of a preferred embodiment of leading curtain spring roller assembly;

FIGURE 6 is an exploded view, partially broken illustrating the construction of a preferred embodiment of leading curtain roller assembly embodied in the invention;

FIGURE 7 is a partially broken and partially cross-sectional view illustrating the construction of a preferred following curtain spring roller assembly embodying the invention;

FIGURE 8 is a perspective view illustrating the construction of the following shutter curtain;

FIGURE 9 is a cross-sectional view taken substantially as shown along line 9—9 of FIGURE 8;

FIGURE 11 is a perspective view illustrating the external appearance of a complete embodiment of focal plane shutter assembly in accordance with the invention; and FIGURE 12 illustrates the complete shutter mechanism ready for installation in the outer protective case of the shutter assembly.

Figure 1:
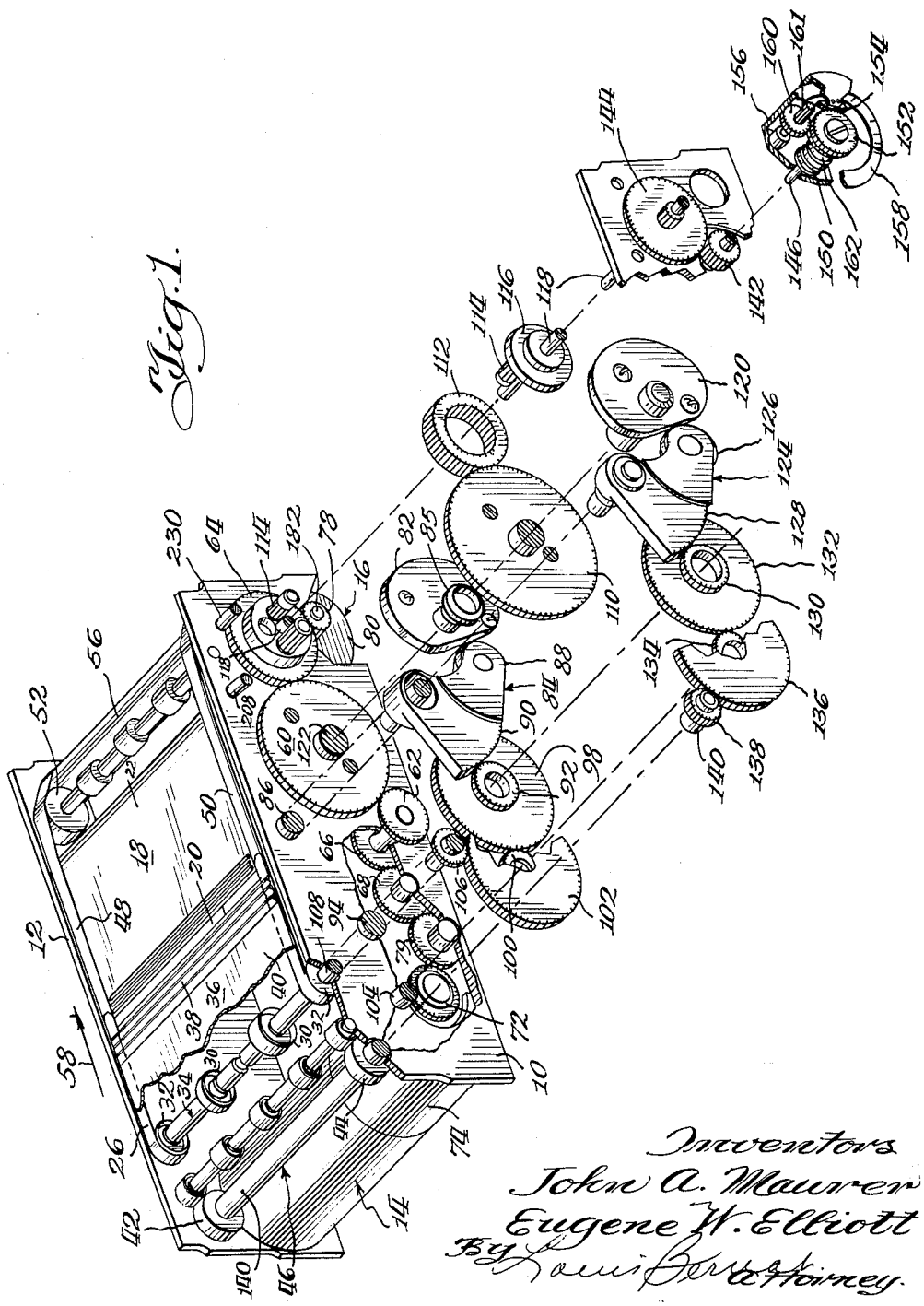
FIGURE 1 is an exploded view, partially broken away of a preferably illustrative embodiment of focal plane shutter in accordance with the invention.

Referring now to the drawing, and more particularly to FIGURE 1 thereof, there is shown an illustrative focal plane shutter assembly embodying the present invention. While the focal plane shutter assembly shown in FIGURE 1 and in the other detailed figures comprises a preferred embodiment of the invention, those skilled in the art will appreciate that this preferred embodiment is merely illustrative of the novel features of the present invention and that other constructions embodying the invention may be made and used without departing from the novel principles thereof.

As shown in FIGURE 1, the focal plane shutter assembly comprises a pair of side plates which are positioned in spaced parallel relationship for supporting a pair of shutter curtains and associated drive equipment therebetween. Thus the focal plane shutter assembly comprises side plate 10 and side plate 12 which advantageously may be spaced from each other by a pair of motor and clutch-brake assemblies, identified as 14 and 16 respectively. While the present illustrative embodiment is disclosed as having the two motor and clutch-brake assemblies 14 and 16, those skilled in the art will appreciate that a single motor and clutch-brake assembly may be utilized in lieu of the dual assembly disclosed herein. However, it has been found advantageous to utilize the dual motor and clutch-brake assembly arrangement since the motors are adapted to be counter-rotating with respect to each other for counter-balancing the focal plane shutter assembly against the adverse effects of motor torque.

In the operation of the illustrative embodiment the motor and clutch-brake assemblies serve to effect the desired movement of a pair of focal plane shutter curtains through associated cam and related drive structures. The manner in which the run down and winding of the focal plane shutter curtains are effected by the motors, cams and associated gears is set forth in detail hereinbelow with reference to the several detailed figures following the exploded view of FIGURE 1.

Each focal plane shutter curtain is adapted to be driven during run down by a separate spring roller associated therewith and is re-wound by the motor and clutch-brake assemblies through its associated cam and gear train. Referring more specifically to the focal plane shutter curtain 18, which will hereinafter be identified as the leading curtain, it can be seen that curtain 18 is defined by a reinforced leading edge 20, a main body portion 22, which is shown as wound around the leading curtain spring roller 24, and a pair of leading curtain drive bands 26 and 28, respectively, which extend from the leading edge 20 and are wound around a pair of guide rollers 32 on the leading curtain roller assembly 34. Advantageously, each of the leading curtain bands 26 and 28 is secured to a guide roller 32 so as to be wound therearound upon rotation of the leading curtain roller assembly 34 and main body portion 22 is similarly secured to spring roller assembly 24.

In a similar fashion, the following curtain 36 is provided with a reinforced following edge 38 having a main body portion 40 adapted to be secured to the following curtain rollers 42 and 44 of the following curtain roller assembly 46 so as to be wound there-around upon rotation of the following curtain roller assembly 46. In addition, a pair of following curtain drive bands 48 and 50 extend from the reinforced edge 38 of the following curtain 36, and over the rollers 52 of idler shaft 54 so as to be secured to and wound around the following curtain spring roller 56.

In the operation of the invention, leading curtain 18 and following curtain 36 are driven in the direction of the arrow 58 during the run down or exposure portion of the cycle by the spring bias force of spring roller 24 and spring roller 56, respectively. At the end of this portion of the cycle, the leading and following curtains are returned to the re-wound or initial position and the spring roller assemblies have their spring bias restored by the action of the motor and clutch-brake assemblies which drive the associated cam and gear trains to complete the shutter cycle.

This action is effected in the following manner which is described particularly with respect to the leading curtain 18. The following curtain 36 is operated in a similar manner by similar elements and therefore a complete understanding of the invention can be had from the following description which pertains particularly to leading curtain 18.

In accordance with a feature of this illustrative embodiment of the invention, a leading curtain cam gear 60, freely rotatable about a cam shaft 122, is driven by a pinion 62 together with a planet carrier gear 64 to initiate run down of leading curtain 18. Pinion 62 is secured to idler 66 which, in turn, is driven by a gear train comprised of idler gears 68, 70, and 72. Idler gear 72 is meshed with the pinion (not shown) of clutch brake assembly 74 which forms a part of the motor and clutch-brake assembly 14. As explained in greater detail hereinbelow, and with particular reference to FIGURE 4 of the drawing, the motor 76 and the clutch-brake assembly 74 are adapted to be electrically energized and controlled to supply driving power to the leading curtain cam gear 60 by means of the above described gear train.

The planet carrier gear 64 is meshed with clutch-brake assembly pinion 78 at the output of the clutch-brake assembly 80 forming a part of the motor and clutch-brake assembly 16. As explained hereinabove, the two motors operating in series drive the leading curtain cam gear 60 at a rate which results in the leading curtain 18 traversing the exposure area at a very high rate, such as 300 inches per second in this illustrative embodiment.

As shown in FIGURE 1, the leading curtain cam gear 60 is fixedly secured, as by means of screws or the like, to a leading curtain cam 82 having a suitable cam surface around its peripheral edge. A leading curtain cam follower assembly 84 is rotatably mounted on a sector gear pivot shaft 86, so as to be freely rotatable therearound, and is provided with a roller 88 at one end thereof in following contact with the peripheral cam edge of leading curtain cam 82. Thus, it can be seen that the leading curtain cam follower assembly 84 is pivoted about the sector gear pivot shaft 86 in accordance with the contour of the leading curtain cam 82 as followed by roller 88. The leading curtain cam follower assembly 84 also is provided with a sector gear 90 which is meshed with a pinion gear 92. Gear 92 is freely rotatable about a shaft 94 which extends between side plate 10 and an outer plate 96 which is spaced outwardly from side plate 10. A gear 98, of larger diameter than pinion gear 92, is securely fastened to the pinion gear 92 for meshing engagement with a pinion 100. Pinion 100 is fixedly secured to a reduction gear 102 of larger diameter and the pinion gear 100 together with reduction gear 102 are freely rotatable about a shaft 104 which extends between side plate 10 and outer plate 96.

Reduction gear 102, in turn, is meshed with pinion 106 which, is adjustably secured to shaft 108 of leading curtain roller assembly 34. Thus, it can be seen that the rotation of the leading curtain roller assembly 34, by means of the intermediate gears, cam followers and cams from the motor and clutch-brake assemblies 14 and 16, serves to re-wind the leading curtain 18 about guide rollers 30 and 32 of roller assembly 34.

In a generally similar fashion, the following curtain 36 is re-wound upon the following curtain rollers 42 and 44 of the following curtain roller assembly 46. In this case, however, the following curtain cam gear 110 is driven by a ring gear 112 which in turn, is rotatably driven as a part of a planetary gear system comprised of the planet gears 114 and planet carrier gear 64. While only three planet gears 114 have been shown in FIGURE 1 for the purpose of simplifying this illustration, it will be understood by those skilled in the art that four or any other suitable number of planet gears 114 capable of providing the driving function effected thereby, advantageously may be utilized in this illustrative embodiment.

Planet gears 114 are rotatably mounted between the planet carrier gear 64 and the planet gear cap 116, which in turn is rotatably supported by the sun gear shaft 118. Those skilled in the art will appreciate that a sun gear (not shown) normally is provided on the sun gear shaft in meshing engagement with the planet gears 114. The planet carrier gear 64 is meshed directly with the clutch brake assembly pinion 78 as described heretofore such that the planet carrier gear 64 is driven by both motor assemblies through the end members comprised of leading curtain cam gear 60 and clutch brake assembly pinion 78 of their associated gear trains.

As the following curtain cam gear 110 is driven by ring gear 112, in the manner just described, it also rotates the following curtain cam 120 which is fixedly secured thereto as by means of suitable screws or the like. Advantageously, a cam shaft 122 extends between the side plate 10 and outer plate 96 and is freely rotatable therein for supporting the leading curtain and following curtain cam gear assemblies. Thus, the leading curtain cam gear 60 and its leading curtain cam 82 may be rotatably supported around the cam shaft 122 while the following curtain cam gear 110 and its following curtain cam 120 may be fixedly secured to the cam shaft 122, so that the leading curtain cam assembly and the following curtain cam assemblies may be operated independent of each other for rotation of the type enabling adjustment of the slit width between the shutter curtains. In the manner described hereinabove with respect to the leading curtain cam follower assembly, the following curtain cam follower assembly 124 comprises roller 126 which is adapted to engage the peripheral edge contour of the following curtain cam 120 as the latter is rotated. The following curtain cam follower assembly 124 also is provided with a sector gear 128 which meshes with the pinion gear 130 for reciprocating rotation in response to the operation of the following curtain cam 120. Cam follower assembly 124 is fixedly secured to sector gear pivot shaft 86, such shaft being freely rotatable between side plate 10 and outer plate 96 between which it extends.

A reduction gear 132 of larger diameter than pinion gear 130 is fixedly secured thereto and the reduction gear 132 in turn meshes with a pinion 134. Pinion 134 in turn is fixedly secured to a reduction gear 136 of larger diameter. Reduction gear 136 meshes with a pinion 138, which is adjustably positioned on the following curtain roller shaft 140 so that in a manner similar to that described hereinabove with respect to the leading curtain the following curtain roller assembly 46 may be rotated for re-winding the following curtain 36 at the end portion of each exposure cycle.

For reasons explained further hereinbelow, one important feature of this invention is the provision of damper ring 85 assembled over and coaxial with cam shaft 122 between the leading curtain cam 82 and the following curtain cam gear 110. Damper ring 85 is maintained in frictional contact with both cam 82 and gear 110 by means of a spring washer 344 and threaded fasteners 346 which are assembled over a threaded portion of cam shaft 122 on the curtain side of side plate 10. Tightening of the fasteners 346 causes greater spring force to be exerted by spring washer 340 which, in turn, increases the frictional engagement between cam 82 and cam gear 110 as exerted by damper ring 85. Damper ring 85 may be of any material having a high and uniform coefficient of friction relative to cam 82 and gear 110 and has in several embodiments of the inventive shutter assembly been manufactured from a high temperature, non-glazing, asbestos filled, brake lining material.

The slit width beween the edges of the leading and following curtains may be adjusted, as desired, by the adjusting knob and gear train connected to the sun gear shaft 118. As shown in FIGURE 1, sun gear shaft 118 extends through and is rotatably in outer plate 96. Sun gear shaft 118 also supports a reduction gear 144 fixed thereon so as to be rotated therewith. A slit width or shutter speed adjusting pinion 142 is meshed with reduction gear 144 and is secured to shutter speed adjustment shaft 146. Shutter speed adjustment shaft 146 terminates exterior of the shutter case in an exposure adjusting knob 148, which advantageously may be slotted to provide adjustment by means of a screw driver or the like. However, the exposure adjusting knob 148 obviously may be provided with a knurled periphery or other convenient manually graspable surface to enable adjustment of the slit width between the leading and following curtains.

Undesirable rotation of sun gear shaft 118 is prevented by means of a compression spring 150 which urges a lock gear 152 into meshing engagement with a sector gear 154. Lock gear 152 is secured to the shutter speed adjustment shaft 146 adjacent the exposure adjusting knob 148, and the sector gear 154 is secured to a housing 156 such that the rotation of sun gear shaft 118 is prevented whenever the lock gear 152 is meshed with the sector gear 154. Adjustment of the exposure adjusting knob 148 therefor, is effected by urging the knob 148 inwardly against the bias of compression spring 150 so as to take the lock gear 152 out of meshing engagement with sector gear 154. After this adjustment is effected, as desired, the compression spring 150 returns the lock gear 152 into locking engagement with sector gear 154 to prevent rotation of the sun gear shaft 118.

In addition, an indication of the extent of slit width is provided by means of an internally geared index ring 158 and a reduction gear 160 which is meshed between the index ring 158 and an index drive gear 162. Index drive gear 162 is secured to shutter speed adjustment shaft 146. Advantageously, the index ring 158 may be calibrated in terms of exposure speed, rather than slit width which is related thereto, to provide an easily readable indication of the exposure speed.

In the following description of the operation of the invention, it will be assumed that the shutter curtains are in the fully re-wound position ready to provide an exposure function upon receiving an exposure initiate pulse from the camera control system which is associated with the focal plane shutter assembly. At this time, before the receipt of the exposure initiate pulse, the motors of the motor and clutch-brake assemblies 14 and 16 are running at full speed, which in one illustrative embodiment of the invention may advantageously be 10,000 revolutions per minute. Also at this time, the clutch of each motor assembly is in the off condition and the brake of each motor assembly is in the on condition, in the manner described in greater detail hereinbelow with particular reference to the detailed drawing of FIGURE 4.

Referring now to FIGURE 4 of the drawing, there is disclosed an illustrative motor and clutch-brake assembly, which for purposes of this description may be the motor and clutch-brake assembly 14 shown in FIGURE 1. In the practice of the invention, both of the motor and clutch-brake assemblies advantageously are identical and operate in a similar fashion except that they are counter-rotating with respect to each other.

As shown in FIGURE 4, the motor and clutch-brake assembly 14 comprises two general portions, namely, a motor portion and a clutch-brake assembly portion. The motor portion, identified as 76, advantageously may take the form of a governor controlled D.C. motor of a type well known in the art, as for example, the type of motor manufactured and sold by the Bay Electric Co. Since the operation of motor 76 is well known, it need not be shown or described in detail herein. The inner end of the motor 76 is provided with a threaded hub 166 which is adapted to be threadedly fastened to the clutch-brake assembly housing 190 at the internal threaded flange 168. When these two portions are rotatably threaded to each other the sun gear 170, which is securely fastened to the output shaft 172 of motor 76 by the threaded fastener 174, is placed in meshing engagement with a plurality of planet gears 176. While only two of such planet gears 176 is shown in FIGURE 4 for purposes of illustration, those skilled in the art will appreciate that a larger or smaller number of such planet gears may be used and in this illustrative embodiment four such planet gears is preferred.

Advantageously, each planet gear 176 is rotatably mounted on a shaft 178, said shafts 178 being disposed in spaced relation about the planet carrier 180. Conveniently, the planet carrier 180 is keyed to the clutch brake output shaft 182 such that the planet carrier is prevented from rotating about the output shaft 182 but is adapted for axial movement therealong.

The several planet gears 176 are meshed with the teeth on the internal periphery of a clutch ring gear 184 so as to cause the clutch ring gear 184 to be rotated in accordance with the rotation of the planet gears when the clutch is in the off condition. In accordance with a feature of this invention the clutch ring gear 184 is provided with an inner facing 186 of a highly permeable magnetic material, as for example, the material known commercially as Armco iron and the like. A clutch coil assembly 188 is mounted in the housing 190 of the clutch brake assembly 74 adjacent the clutch gear ring 184. As shown in FIGURE 4, the coil assembly 188 comprises a plurality of turns of electrical conductors adapted to be energized from any suitable power source by the power cable 192.

The coil 188 advantageously is mounted in a magnetic pole piece 194, shown as a toroid of channel construction in FIGURE 4, and the open end of the pole piece 194 is provided with a band 196 of high friction material, such as that known commercially as neoprene or the like. In the operation of the clutch assembly, the clutch ring gear 184 normally is permitted to rotate freely in response to the driving power of motor 76 when the coil assembly 188 is not energized, since the clutch ring gear 184 is spaced from the friction band 196. When electrical power is supplied to the power cable 192 to place the clutch in operation, the coil assembly is energized and the magnetic force created at the pole structure 194 attracts the clutch ring gear 184 so as to place the highly permeable magnetic material 186 in frictional contact with the friction band 196. This stops the rotation of clutch ring gear 184 even though the motor 76 continues to rotate.

Those skilled in the art will appreciate that under these conditions, the planet carrier 180 is caused to rotate and thereby rotates the clutch brake output shaft 182. As long as the clutch holding power is supplied to the cable 192 to maintain the coil assembly 188 energized, the clutch will remain in the "on" condition and the clutch brake output shaft 182 will be rotated in its bearings. When the power at the cable 192 terminates and the coil assembly 188 becomes de-energized, the clutch ring gear 184 is no longer attracted to the friction band 196 and therefore the clutch ring gear 184 will be rotated by the planet gears 176 until the next clutch energizing operation.

A brake assembly is provided in the clutch-brake housing 190 adjacent the clutch assembly, and as its operation is similar in many respects to the clutch operation, it will now be described. The brake assembly comprises a brake coil 195 which is formed of a plurality of conductor turns positioned within a channel shaped toroidal pole piece. The open end of the channel shaped toroidal pole piece is provided with a band of friction material 200, such as a band of neoprene or the like. A relatively thin disc 202 is positioned on the clutch brake output shaft 182 in such a manner that it is axially slidable with respect to the output shaft 182 but cannot be rotated thereon. Conveniently, the disc 202 is provided with a ring of a highly permeable magnetic material, such as the ring 204 at the outer periphery of disc 202, positioned adjacent the brake coil assembly 194. Those skilled in the art will now appreciate that when the coil assembly 194 is energized by the power cable 198, the disc 202 is magnetically attracted to the coil assembly of the brake to cause the ring 204 to frictionally engage the friction band 200. Since the disc 202 is keyed for non-rotation on the clutch brake output shaft 182, this frictional engagement between the band 204 and the friction band 200 tends to retard and stop the rotation of the output shaft 182.

In the operation of the invention, the exposure initiate pulse from the camera control system to the shutter assembly causes the clutch to be energized and the brake to be de-energized so that, as explained hereinabove, the clutch brake output shaft 182 is rotated. The rotation of the output shaft 182 of each motor and clutch-brake assembly 14 and 16 causes the leading curtain cam gear 60 with its attached cam 82 to be rotated through its associated gear train. Also, the following curtain cam gear 110 and its attached cam 120 is rotated through the planet gear system associated with the planet carrier gear 64 at the particular slit width offset determined by the selective setting of the exposure adjusting knob 148. Thus, it now will be appreciated that the traverse of the focal plane shutter curtains across the format area has been initiated by clutching in the curtain drive to the motor clutch assemblies. However, in accordance with the operation of the invention, the major part of the shutter curtain movement across the format area is effected by mechanical means in the form of curtain spring rollers which take over the curtain drive function from the motor assemblies after the curtain movement is initiated.

In the foregoing description of the operation of the curtains and of the setting of slit widths between the curtains, reference was made to a damper ring 85 positioned in frictional engagement between leading curtain cam 82 and following curtain cam gear 110. It now will be described how damper ring 85 advantageously serves to insure the attainment of several important objects of the invention.

If the two curtain cams 82 and 120 together with the associated gearing were free to rotate relative to each other, and were constrained only by their connection to each other through the exposure setting planetary type differential, sufficient gear backlash and spring constants would be introduced between the two cams to permit relatively large movements between the slit defining reinforced edges of the two curtains. These movements, if permitted, would occur during curtain travel whenever an acceleration is applied of opposite direction to the acceleration last applied. Since such reverse accelerations and resulting slit width variations may be caused by manufacturing inaccuracies or abrupt movements of the transporting aircraft and may occur at any point in the shutter cycle, it is apparent that if exposure variations are to be eliminated, such relative movements of the cams and slit edges must be prevented. This, in the instant invention, is accomplished by damper ring 85 in conjunction with cam 82, cam gear 110 and the controlled amount of friction therebetween, which results from the known characteristics of materials used and the known and controlled pressure between the several parts assembled over cam shaft 122.

In the practice of the invention, the friction between damper ring 85, cam 82 and cam gear 110 is set high enough so that inadvertent accelerations encountered in the run-down portion of the shutter cycle will not generate sufficient forces to disturb or in any way change the positions of the leading and following curtain cams relative to each other. However, this friction level is not set high enough to make the adjustment of slit width difficult or high enough to inhibit a use, as described hereinbelow, of the otherwise undesirable backlash in the exposure setting planetary type differential.

With the friction level between the cam and cam gear set at the above described desirable level, when the motor clutches are engaged to initiate a shutter cycle, the cam gear 60, leading curtain cam 82, the leading curtain 18 and the gears and cam followers associated with the leading curtain are immediately set in motion. Then, after an interval during which gear backlash and spring constants are taken up and during which the damper ring 85 permits the leading and following curtain cams to slip relative to each other, the ring gear 112 sets in motion cam gear 110, and through the various gears and cam-follower linkage, the following curtain 36. Of course, this time interval of slip between the two cams is very short, being measured in fractions of a milli-second. However, even this very short interval which results in the incremental picking up of total load, permits a significant reduction in the size and power consumption requirements of the driving motors. Also, because of the friction between the cams being sufficient to inhibit movements therebetween during the run-down portion of the shutter cycle, the incremental pick-up of load is accomplished without any other adverse effects.

Reference is now made to FIGURES 5 and 7 which disclose the details of the leading curtain spring roller assembly and following curtain spring roller assembly, respectively. The leading curtain spring roller assembly 24 shown in FIGURE 5 comprises a tubular sleeve roller 206 having end caps 210 and 212 positioned at its respective ends. Manifestly, the end caps 210 and 212 may be secured to the tubular sleeve roller 206 by any suitable means, as for example, the screw fasteners 213, cement, or the like. A shaft 208 is rotatably journaled within the end cap 210, as by means of suitable bearings or the like, and a shaft 209 is similarly journaled for rotation within the end cap 212 to provide a support for an inner elongated tube 214. The elongated tube 214 advantageously may be mounted for rotation on the shafts 208 and 209, as by means of the bearings 216 at each end of the tube 214. Preferably, a helical torsion spring 218 is wound around the elongated tube 214 to provide the required driving force for the sleeve roller 206 of the roller assembly. Towards this end, the helical torsion spring 218 is secured at one end 220 to an enlargement or collar 222 on the shaft 208. The spring may be fastened to the collar 222 in any suitable manner, as by means of the screw fastener 224 or by any other fastening means capable of affixing the spring end 220 to the shaft 208. The opposite end of the elongated torsion spring 218, namely the end identified at 226, is secured to the end cap 212 in any suitable fashion so that the elongated torsion spring 218 may be wound by rotating the sleeve roller 206 in one direction upon re-winding of the leading curtain shutter 18, and when the shutter curtain is released, the torsion spring 218 unwinds to drive the leading curtain across the format area.

The following curtain spring roller assembly 56 is shown in FIGURE 7 of the drawing. As there shown, the following curtain spring roller assembly 56 comprises an elongated shaft 230 which extends the entire length of the spring roller assembly concentric with the main axis thereof. A tubular sleeve roller 232 is positioned around shaft 230 for the major portion of its axial extent, and this tubular sleeve roller 232 is supported thereon by means of the end cap 234 at one end of shaft 230 and the roller ring 276 adjacent the remote end of shaft 230. Roller ring 276 rotates freely about a rotating hub 240. Advantageously, the free rotation of the following curtain spring roller sleeve 232 and the curtain drum 244 is facilitated by means of the bearing 242 provided at one end of shaft 230 and the bearings 246 provided at the other end of the shaft 230. Advantageously, a collar 236 is fixedly secured to the shaft 230 as by means of the fastening 248 inserted through the opening 250 into the shaft 230.

The shaft 230 also is provided with a pair of bearings 252 for rotatably supporting a spring mounting tube 254 thereon. As shown in FIGURE 7, a helical torsion spring 256 is wound around the tube 254 with one of its ends 258 being adapted to be fixedly secured to the peripheral edge of collar 236 as at the cut-away segment thereof 260. The remaining end 262 of the helical torsion spring 256 is adapated to be fixedly secured to the peripheral edge 264 of a cut-away portion of rotating hub 240. Thus, it can be seen that the spring mounting tube 254 is free to rotate on shaft 230 at the bearings 252, and independent thereof, the rotating hub 240 and its associated curtain drum 244 is free to separately rotate about the shaft 230 at the bearings 246 constrained only by its connection with torsion spring 256.

The sleeve roller 232 and the curtain drum 244 normally are independent of each other and in accordance with a particular feature of this invention they are adapted to be coupled together by means of a universal T 266 for joint rotation about the shaft 230. When the following curtain spring roller is assembled, the universal T 266 is positioned within the aperture 268 of hub 240 so as to be fitted within the shaped openings 270 of curtain drums 244 and 272 of roller ring 276. The universal T 266 is held in position by means of the set screw 278 which is adapated to be fittedly engaged with the groove 280 provided in the body of universal T 266. Thus, it can now be appreciated that the following curtain spring roller assembly 56 may have its torsion spring 256 wound fully to an operative condition by the re-winding of the following curtain 36 therefrom, and upon rundown of the shutter curtains the torsion spring 256 will unwind to drive the following curtain 36 across the format area.

In accordance with a particular feature of the present invention, the universal T 266 at one end of the following curtain spring roller assembly 56 serves to provide automatic compensation for variations in length of the following curtain bands 48 and 50. If no compensations were to be provided, the required tolerances in the band lengths for curtains of the size used in this illustrative embodiment would be so close as to be impractical to achieve in the practice of the invention. Without such compensation and without maintaining such close tolerances, drive bands of unequal length would result in one of the bands carrying the entire load of the shutter curtain movement across the format area with the result that the high stresses present at the junction of the drive band and the leading edge of the following curtain would quickly cause destructive failure of the curtain at this junction. This undesirable result is avoided in accordance with the invention by the provision of the universal T 266 which has a pivotal action that serves to equalize the pulling forces on the two drive bands by equalizing any minor variations in length therebetween.

While means have not been illustrated in detail for securing the shafts 208 and 230 of the leading and following spring curtain rollers 24 and 56, respectively, against rotation in the side frames, it will be appreciated by those skilled in the art that suitable means capable of securing the shafts are well known. In fact, in the embodiment here described, and as shown in FIGURE 12, capstans 332 and 334 are assembled over the outermost ends of shafts 208 and 230, respectively, and are coaxial therewith. These capstans 332 and 334 each have integral therewith, reduced diameter portions 336 and 338 respectively which are received into apertures provided in outer plate 96. The capstans are secured against rotation about their respective spring roller shafts by fastening means (not shown), which may take the form of set screws or any other suitable fastener. The reduced diameter portions 336 or 338 of the capstans are held from rotation in their respective apertures in outer plate 96 by means of screws 340 and 342.

It is a feature of this invention that both the leading and the following curtain spring roller assemblies have their internal torsion springs maintained under a pre-tension which is not released when the curtains have reached their rundown condition. This pre-tension affords two principal advantages. These are the maintenance of a lower stress ratio in the springs than would otherwise be possible and the assurance that the springs will be operated at a linear portion of their deflection-force curve characteristic. It will be appreciated that this pre-tension may readily be set into the curtain roller springs by releasing locking screws 340 and 342, rotating the capstans 332 and 334 until the proper pre-tension is set into the springs, and then again securing the locking screws 340 and 342.

Proceeding with the description of the operation of the invention, it has been described how the leading curtain and following curtain spring roller assemblies 24 and 56 have their helical torsion springs wound to the operative condition in preparation for driving the curtains across the format area. This operation is initiated, as explained hereinabove, by an exposure initiate pulse from the camera control system to clutch the two drive motors to the leading curtain and following curtain cam gears. Rotation of the leading cam gear 60 and the following curtain cam gear 110 by the drive motors will, in turn, cause their associated cams 82 and 120, respectively, to be rotated against the action of their respective cam follower assemblies. The manner in which each of the cams 82 and 120 constrain the movement of their associated curtains is shown graphically in FIGURE 10 of the drawing. In this graph, the ordinates correspond to the positions of the leading edges of the leading curtain in terms of inches travelled while the abscissae correspond to time in milliseconds and to cam rotation in degrees. The zero time and zero cam rotation point on the horizontal axis of the chart indicate when the cycle is initiated and the curve extends for a full cycle time displacement period ending with the shutter re-wound and in readiness for a new cycle. At the zero time point, the leading edge of the leading curtain cam follower 84 is on the concentric portion of maximum radius on cam 82. Practically simultaneously with the beginning rotation of cam 82 at time zero, the cam follower assembly 84 begins to rotate inwardly towards the cam 82 following the peripheral contour thereof. This permits the helical torsion spring 218 in the roller assembly 24 to pull the leading curtain across the format area as shown by the arrow 58 in FIGURE 1 of the drawing. During the time interval from zero time to approximately 15 milliseconds, point "x" on the curve which is the start of the exposure, the cam 82 is shaped to allow constant acceleration of the curtain at a predetermined rate. Those skilled in the art will appreciate that this rate must not be quite as high as the acceleration that would be imparted by the helical torsion spring 218 in the roller assembly 24 if the roller was completely free to rotate about the shaft 208. Thus, if at any point the acceleration rate were to become too high, the cam follower 84 would not be kept in contact with the cam 82, and severe bouncing of the entire system with development of disruptive stresses in the band portions of the curtain would occur.

In accordance with a novel feature of the present invention, such adverse effects of bouncing and stresses in the system are avoided by energizing the brake in each of the drive motors in a partial manner by a reduced current, thereby applying a constant drag to the cam 82 to maintain the cam follower 88 in constant contact therewith. As shown by the FIGURE 10 diagram, applicants have found that for the embodiment described this partial energizing power for the brake of the driving motors may be applied at the point "z" on the curve or at approximately 7 milliseconds after the beginning of the cycle. This partial energization of the brake continues through the entire exposure period to terminate at the point "y" on the curve or at approximately 32 milliseconds after the beginning of the cycle. It has been found advantageous in the practice of the invention to apply approximately 25% of full power to the brake mechanism of each driving motor to produce the desired drag on the cam 82. Further, it is noted that the brake power is applied at the same time the clutch of the motor clutch brake assembly is energized since the latter is energized for substantially the entire cycle. In fact, the clutch is energized at the beginning of the cycle and remains energized until the point where full power is applied to the brakes at the end of the cycle. Since the action of the brakes insures the contact between the cams and their rollers at the early part of the cycle, constant velocity of the shutter curtains may be achieved during the exposure period of the shutter action. Thus, the cam 82 is shaped to constrain the shutter curtain to move with zero acceleration, that is, with constant velocity during the part of the cycle that the exposure is made. This is graphically shown at the linear portion of the curve in FIGURE 10 of the drawing between point "x," the exposure start time at approximately 15 milliseconds, and point "y" the exposure stop time at approximately 32 milliseconds. The manner in which the brakes and clutches are energized at the proper times in the cycle is explained in greater detail hereinbelow.

Figure 10:
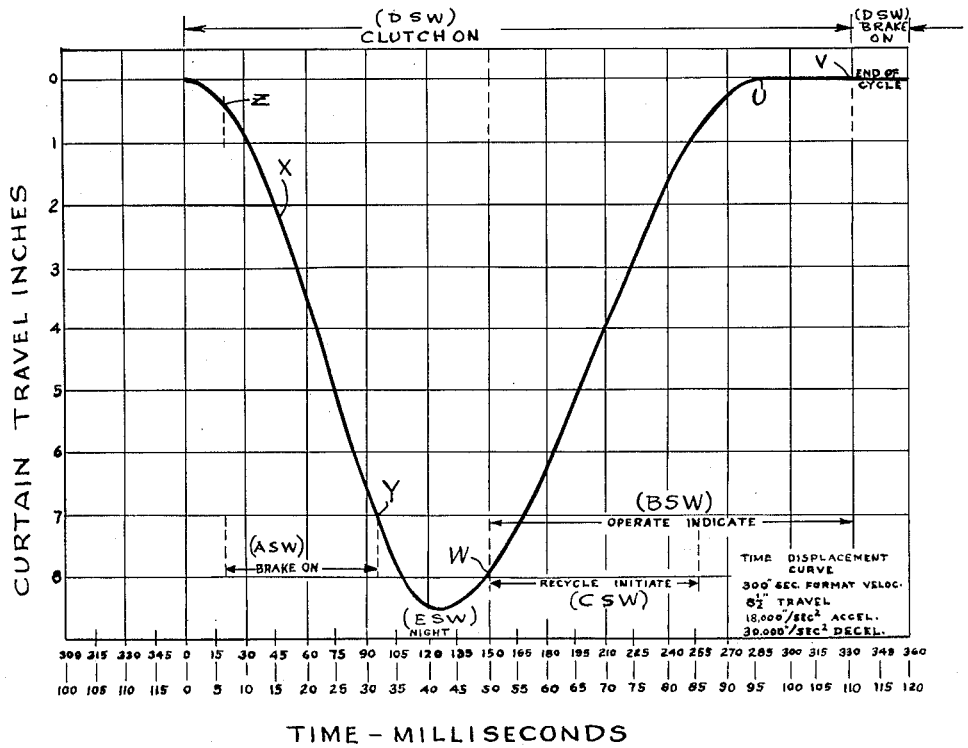
FIGURE 10 is a graph illustrating the curtain travel as a function of time and cam rotation during one complete cycle of operation of the invention.

Continuing now with the description of the shutter cycle, graphically illustrated in FIGURE 10 of the drawing, it can be seen that the curtain shutters continue to travel after the exposure period is terminated and the partial brake power is removed, both conditions occurring at point "y" on the curve. At this time, the leading curtain cam 82 imposes a controlled deceleration on the leading shutter curtain 18 so that this curtain is brought to rest at the lowest point on the curve, which is approximately between 120° and 135° of cam rotation and a time period of between 40 and 45 milliseconds after exposure initiation. Immediately after the leading shutter curtain has come to rest, the cam follower 84 is lifted by the rising portion of cam 82 to initiate the rewinding action which returns the leading shutter curtain 18 to the initial or fully rewound position. As can be seen, the curtain follows a sine curve function during the rewind portion of the shutter cycle. As indicated by the curve in FIGURE 10, leading shutter curtain 18 is fully rewound at the point "U" which is approximately at 285° of cam rotation and a time period of 95 milliseconds after exposure initiation.

Shortly after the time indicated at "U" on the FIGURE 10 curve, the clutch is de-energized and full energizing power is applied to the brakes for the purpose of bringing the cam 82 to a complete stop. This clutch off and full brake on condition is initiated at the time indicated at "v" on the FIGURE 10 curve which is approximately at a 330° cam rotation and a time period of 110 milliseconds after exposure initiation. The cam 82 comes to a complete stop as a result of the full braking action at the end of this cycle or after 360° of cam rotation at a time period lapse of 120 milliseconds after exposure initiation. At this time, the shutter is in a fully rewound position and in readiness for the initiation of a new shutter cycle.

It will be recalled from the previous description, that during the run-down portion of the shutter cycle it was a feature of this invention to utilize a universal coupling member in the following curtain spring roller assembly 56 for the purpose of compensating for any variations in length between the bands of the shutter curtain 36. In a similar manner, during the rewind portion of the cycle, it is advantageous to employ a universal coupling member in the leading curtain spring roller assembly 34 to likewise compensate for variations in the lengths of the bands 26 and 28 connected to the body portion of the leading curtain 18. The construction of an illustrative embodiment of leading curtain roller assembly 34 which provides such compensation is shown in FIGURE 6 of the drawing.

As shown in FIGURE 6, the leading curtain roller assembly 34 comprises an elongated roller shaft 108 which extends the entire length of the leading curtain roller assembly 34. Suitable bearings 282 (one shown) are provided at the ends of the roller shaft 108 for enabling the roller assembly to be rotatably positioned in the side plates 10 and 12 of the shutter frame assembly. As particularly shown in FIGURES 1 and 6, an adjustable pinion 106 is secured to the roller shaft 108, as by means of a pinion clamp 284, which adjustable pinion 106 extends outwardly from the side plate 10 for meshing engagement with the reduction gear 102, previously described with respect to FIGURE 1. Advantageously, the opinion 106 is made adjustable to permit the slit width between the shutter curtains to be calibrated with respect to the off-set between the two cams 82 and 120. Once this calibration has been effected, the adjustable pinion is locked in position and the slit width between the shutter curtains then will be solely dependent upon the adjustment of the exposure adjusting knob 148.

In accordance with the invention, a pair of leading curtain roller shafts of tubular construction and of greater internal diameter than roller shaft 108 are positioned over the roller shaft 108 so as to be concentric therewith. These tubular roller shafts comprise a shaft portion 286 and a shaft portion 288 which are of approximately equal length and which are positioned over the internal roller shaft 108 so as to define a relatively small gap or spacing therebetween at approximately the center of that portion of the roller assembly which is disposed between the side plates 10 and 12.

As shown in FIGURES 1 and 6, a plurality of guide rollers are spaced axially on and secured to the shaft portions 286 and 288 of roller assembly 34, which guide rollers are identified as 30 for guiding the body portion of the shutter curtain and as 32 for guiding and securing the drive bands of the shutter curtain. It will be noted that the guide rollers 32 are provided with tapped and countersunk holes 306 into which suitable dimples on the drive bands are adapted to be positioned and secured by a suitable screw fastener.

The shaft portions 286 and 288 are initially freely rotatable about roller shaft 108 but axial movements between the shaft portions and the roller shaft are restrained by means of a pair of retaining rings 290 which are adapted to be fitted within mating retaining ring grooves 292 of the roller shaft 108 positioned outboard of both shaft portions. In addition, it is a feature of this invention to provide a universal pivot member which further serves to restrain axial and rotary movement between the roller shaft and the two shaft portions. This universal pivot is identified at 294 and comprises a T-shaped member having a shank portion 296 and a head portion 298. A pivot hole 300 is provided in the roller shaft 108 for receiving the shank portion 296 of universal pivot 294. Additionally, each of the shaft portions 286 and 288 is provided with a shaped slot 302 adapted to receive the ends of the universal pivot head portion 298. If desired, the shank portion 296 of universal pivot 294 may be provided with a suitable groove 304 adapted to receive a retaining ring for holding the universal pivot securely in place within the roller shaft 108.

In the operation of the leading curtain roller assembly, the universal pivot serves to compensate for differences or variations in the length of leading curtain drive bands 26 and 28 to thereby avoid the adverse effects of undue stress and unequal loads. This advantageous result is achieved by the rotation of the universal pivot in its pivot hole in response to the existence of unequal length bands. Rotation of the universal pivot rotates shaft portions 286 and 288 relative to each other so that they transmit driving power from the gear train equally to both shutter curtain bands, thereby equalizing or balancing the load distribution on the two bands.

The construction of the shutter curtains is illustrated in FIGURES 8 and 9 of the drawing. While only one shutter curtain is shown for purposes of illustration, it will be appreciated by those skilled in the art that the construction of the leading and following shutter curtains are substantially identical with the exception that the following curtain normally is longer than the leading curtain. As shown in FIGURE 8, which particularly illustrates the following curtain 36, the shutter curtain is comprised of a normally rectangular body portion 40 having a reinforced edge 38 from which there extends a pair of spaced-apart, parallel, elongated bands 48 and 50, respectively. While other materials and thicknesses may be used, it has been found to be particularly advantageous to form the shutter curtain of a thin, hard-rolled metal, such as stainless steel, having a thickness in the range 0.0010 to 0.0015 inch. Preferably, the shutter curtain is made black in color to eliminate undesirable reflections in the optical path of the associated camera.

Due to the relative thinness of the shutter curtain, it has been found advantageous to provide a reinforced edge, such as the edge 38, as one of the slit defining edges for the shutter assembly. FIGURE 9 shows a cross-sectional view of the representative reinforced edge 38. This reinforced edge 38 has been reinforced in a unique manner in this particular embodiment of the invention to provide additional rigidity of the shutter curtain and further to assist in distributing the load from the bands 48 and 50 uniformly across the entire width of the slit defining edge.

As shown in FIGURE 9, the reinforced edge 38 may comprise three spaced reinforcing members, namely, the reinforcing members shown at 308, 310 and 312. The reinforcing member 308 advantageously comprises a strip of stainless steel having the dimensions of 0.008 inch in thickness and .016 inch in width and which extends across the entire width of the shutter curtain. This stainless steel strip 314 may be securely held in place by means of a suitable adhesive and in addition by an adhesively secured cover 316 of some tough, flexible and chemically inert material, such as nylon. Advantageously, this cover 316 is provided over the stainless steel strip 314 and continues around the leading edge of the shutter curtain and under the bottom of such curtain as indicated in FIGURE 9 of the drawing.

Each of the reinforcing members 310 and 312 comprises a plurality of stainless steel tubes which are positioned in side-by-side relationship and extend across the entire width of the shutter curtain. In this embodiment it has been found advantageous to utilize stainless steel tubes 318 having an outside diameter of approximately 0.012 inch, which tubes are held in place on the shutter curtain by means of a suitable adhesive and in addition, by means of the cover members similar to cover 316 described hereinabove. In this particular embodiment, the reinforcing member 310 advantageously is provided with four parallel spaced steel tubes 318 and the reinforcing member 312 advantageously is provided with four such stainless steel tubes 318 in parallel, side-by-side relation.

To provide additional reinforcement at the points of maximum stress concentration where the drive bands 48 and 50 are joined to the body portion 40 of the shutter curtain 36, it has been found advantageous to utilize additional reinforcing strips 324 of the same tough resilient material, such as nylon, utilized in the covers of reinforcing members.

It further will be noted, in FIGURE 8 of the drawing, that the ends of the drive bands 48 and 50 remote from the body portion 40 of shutter curtain 36 are provided with suitable dimples 326 which are adapted to be fitted into suitable tapped and counter-sunk holes provided in the following curtain spring roller 56 where the drive bands are secured to the roller sleeve 232 and curtain drum 244, respectively. In addition, the body portion 40 of the following curtain 36 is provided with a pair of dimples 328 which are adapted to be fitted within and secured to suitably provided tapped and counter-sunk holes in the following curtain rollers 42 and 44 of the roller assembly 46.

FIGURE 2 illustrates the mechanism by which the shutter is made to operate in response to electrical pulses and the mechanism by which the camera and its associated camera control system are made to operate in response to the shutter action. As shown in FIGURE 2, a switching cam ring assembly 330 is positioned for free rotation about cam shaft 122. Cam shaft 122 may also be seen in FIGURE 1. The switching cam ring assembly 330 is secured to the leading curtain cam gear 60, as by means of screws or other suitable fastening means, for rotation therewith. As shown in FIGURE 1, the leading curtain cam gear 60 is positioned on the side of side plate 10 which is exterior of the curtain assembly while, as shown in FIGURE 2, the switching cam ring assembly 330 is positioned on the opposite side of side plate 10. A plurality of miniature electrical switches which advantageously may be small snap action switches, are positioned around the switching cam ring assembly 330 in spaced and operative relation thereto. These electrical switches, identified as ASW, ESW, BSW, CSW and DSW, are each provided with a suitable roller actuated armature for operation at predetermined points during a rotational cycle of the switching cam ring assembly as determined by the particular contours of the individual cam rings comprising the switching cam ring assembly.

Reference is made to FIGURE 3 which is a cross-section taken substantially as shown on line 3—3 of FIGURE 2 to illustrate the individual cam rings forming the cam ring assembly. As shown in FIGURE 3, cam ring 330 is formed of a plurality of parallel plate cams which are positioned in side-by-side relationship for common rotation. The cam ring A is adapted for operative engagement with the electrical switch ASW, the cam ring B is adapted for operative engagement with the electrical switch BSW, the cam ring C is adapted for operative engagement with the electrical switch CSW, and the cam ring D is adapted for operative engagement with both of the electrical switches DSW and ESW. While in this particular illustrative embodiment the switching cam ring assembly 330 is comprised of four separate cam rings, those skilled in the art will readily appreciate that the number of cam rings utilized may be greater or smaller in number depending upon the particular requirements of the associated camera and camera control system and the functions desired to be effected during operation.

The explanation of the operation of switching cam ring assembly 330 and its affiliated electrical switches can be facilitated by reference to the graph of FIGURE 10 of the drawing. During the part of the shutter cycle defined between the points Z and Y on the curve, which corresponds to that time during which the partial brake power is applied, this partial brake power is switched in and out by means of the plate cam A in conjunction with its associated switch ASW. Thus, the cam contour of the plate cam A is such as to actuate the electrical switch ASW during the time period from approximately 7 milliseconds to approximately 31 milliseconds after cycle initiation, during which time period partial energizing power is supplied to the brake toroidal coil assembly of each motor for effecting the desired partial braking action.

During the time period from 50 milliseconds to 110 milliseconds after shutter cycle initiation as indicated between the points W and V on the FIGURE 10 curve, the electrical switch BSW is actuated by its associated cam ring B to provide indications of proper operation to the camera control system. For example, actuation of electrical switch BSW will result in operation of electrical indicating lights during each cycle, and the operation of suitable counters for effecting a totalizing count of the number of exposures made.

During the time period from 50 milliseconds to 85 milliseconds after shutter cycle initiation, as indicated on the FIGURE 10 curve as the recycle initiate period, the electrical switch CSW is actuated by its associated cam ring C to provide a film recycle initiate pulse. In the operation of the camera system, this film recycle initiate pulse serves to indicate the completion of a photographic exposure and is used to initiate camera action for causing the exposed film to be moved to a storage spool and for bringing unexposed film to the exposure area for a subsequent exposure cycle.

The purpose of the D cam ring and its associated electrical switch DSW is to provide a clutch holding function after an exposure initiate pulse from the camera or camera control system has initially energized the clutches of the motor-clutch-brake assemblies. Swith DSW also provides means for de-energizing the clutches and energizing the brakes at the end of the shutter cycle. This is indicated in the FIGURE 10 curve by the time period beginning shortly after the zero or initial time and until 110 milliseconds thereafter during which time period the clutches are maintained in an energized condition. At the 110 milliseconds time, point V in the FIGURE 10 curve, the D cam ring and its associated electrical switch DSW act to de-energize clutches and simultaneously cause full power to be applied to the brakes for stopping the cam rotation and terminating the shutter cycle.

The ESW electrical switch, as stated hereinabove, is associated with the D cam ring and serves to provide a night stop function. A particular feature of the inventive focal plane shutter assembly is its ready adaptability to the type of operation known as night capping. In this well-known type of operation, one of the shutter curtains is locked in a format aperture clearing position while the other shutter curtain is left free to traverse the format aperture on both the run-down and re-wind portions of the exposure cycle.

Upon a control system signal to the shutter assembly that night operation is to begin, a locking device such as a solenoid actuated pin (not here shown) is inserted in the following curtain gear train to lock that gear train and the associated following curtain in its rewound position. After the locking of the following curtain in the rewound position, a pulse is applied to the shutter to initiate exposure and in response thereto only the leading curtain runs down or traverses the format aperture. However, it is a particular feature of this invention that during this type of a night mode of operation, the switch ESW acting in response to the rotation of the plate cam D terminates energization of the clutches of the two motor assemblies after the format aperture has been completely unblocked by the leading curtain.

The leading curtain is maintained in this aperture unblocking position and unwound until such time as suitable detecting circuitry in the connecting camera control system detects the burst of a pyrotechnic flare. The burst of the flare is used by the control system to initiate a pulse which again energizes the clutches to rewind the leading curtain. However, here, unlike the normal or day operation, previously described, the cycle does not end with the cams stopping at the zero time position of the graph of FIGURE 10, but instead the cams continue to cycle until the leading curtain again is run-down and reaches the aperture unblocked position. This operation of detecting the pyrotechnic flare and recycling of the leading curtain continues until the end of night capping operation.

It will be appreciated by those skilled in the art that the inventive focal plane shutter assembly is also adapted for use in night operations utilizing electronic flash in place of pyrotechnic flares. This facility of the inventive focal plane shutter to operate with electronic flash during night operations is, to the best of the inventors' knowledge, unique. In the night electronic flash mode of operation, the inventive focal plane shutter operates in a manner very similar to that of day operation. However, in this mode of operation the slit between leading and following curtains is opened to its widest extreme, approximately 5 inches in this illustrative embodiment. It will be appreciated that with a slit width of 5 inches and a format aperture of 4½ inches, the entire format will be unblocked before the reinforced edge 38 of the following curtain reaches the edge of the format aperture. In fact, with the speeds of shutter curtains employed in the inventive shutter assembly and a 5 inch slit width, 2½ milliseconds will elapse from the time that this condition of a completely open format aperture first exists until the time when the reinforced edge 38 of the trailing curtain 36 begins to block the format aperture area. During these 2½ milliseconds, the electronic flash equipment that forms a part of the camera control system must be signalled to initiate a flash to expose the film in the camera. It will be appreciated that while a cam and switch to initiate electronic flash operation have not been shown in the drawings, that this electronic flash initiate control pulse may be formed by an additional cam and cam switch associated with the leading curtain in a manner similar to the association of switches ASW, BSW, etc. The additional switch for initiating the electronic flash has not been shown to simplify the drawing illustration, but, it will be appreciated by those skilled in the art that such switching capability is easily within the scope of this invention. This unique capability of the inventive focal plane shutter to reliably initiate an electronic flash pulse at an extremely precisely located point in its rundown cycle is dependent upon many of the features described and discussed hereinabove. However, principal among these features is the provision of the damper ring 85 located between the two curtain cam assemblies which enables accurate determinations to be made of the positions of the reinforced edges defining the widened slit between the shutter curtains.

FIGURE 11 illustrates the appearance of the complete shutter assembly 360 before its assembly to camera body and optical components, captive bolts 354 providing means for such assembly. Case 352 carries thereon a plurality of trunnion bearings 356 for use in supporting the complete camera in a camera mount. A door 362 in case 352 provides access to the interior mechanism of the shutter assembly 360. Pendent cables 350 and female connector 364 provides electrical connections to camera and camera control system electrical circuitry. Plate 358, which is provided with a format opening 366, serves to protect the shutter curtains during off camera handling of the shutter assembly. Exposure setting knob 148 protruding outwardly from the shutter mechanism terminates flush with case 352 and exposure dial face 368. Exposure dial face 368 has an arcuate slot 370 through which can be observed the exposure index ring gear illustrated and described in conjunction with FIGURE 1.

While there has been shown and described a specific embodiment of the present invention, it will of course be understood that this embodiment is merely illustrative and that various modifications and alternative constructions can be made without department from the true spirit and scope of the invention. Therefore, it is intended by the appended claims to cover all of such modifications and alternative constructions as fall within their true spirit and scope.

What is claimed as the invention is:

1. The improvement of a focal plane shutter assembly comprising a focal plane shutter supporting frame, first and second shutter curtains mounted for movement in said frame to provide an exposure function, first rotatable cam means coupled to said first shutter curtain by a cam follower and gear train, second rotatable cam means coupled to said second shutter curtain by a cam follower and gear train, a pair of contra-rotating drive motor and brake-clutch assemblies, said drive motor and clutch-brake assemblies being adapted to be coupled to said gear trains for driving said first and second rotatable cams at the same rotary velocity, said clutch-brake assemblies being selectively actuatable to clutch said drive motors to said gear trains to provide driving power for said rotatable cams and being further selectively actuatable to apply braking force to said rotatable cams for stopping the rotation thereof at the end of an exposure cycle, selectively actuatable differential means coupled to the gear train for said second rotatable cam means to vary the phase relationship between said first and second rotatable cam means to thereby vary the spacing between the edges of said shutter curtains, damping means positioned between said first rotatable cam means and the cam gear for said second rotatable cam means and in frictional contact therewith to improve the accuracy of the exposure function, roller means for said curtains coupled to said gear trains for effecting the desired movement of said shutter curtains, and universal pivot means in said roller means for compensating for variations in the distances between the fastening points of the shutter curtains on their roller means.

2. The improvement of a focal plane shutter assembly comprising a focal plane shutter supporting frame, first and second shutter curtains mounted for movement in said frame to provide an exposure function, first rotatable cam means coupled to said first shutter curtain by a cam follower and gear train, second rotatable cam means coupled to said second shutter curtain by a cam follower and gear train, a pair of contra-rotating drive motor and brake-clutch assemblies, said drive motor and clutch-brake assemblies being adapted to be coupled to said gear trains for driving said first and second rotatable cams at the same rotary velocity, said clutch-brake assemblies being selectively actuatable to clutch said drive motors to said gear trains to provide driving power for said rotatable cams and being further selectively actuatable to apply braking force to said rotatable cams for stopping the rotation thereof at the end of an exposure cycle, selectively actuatable differential means coupled to the gear train for said second rotatable cam means to vary the phase relationship between said first and second rotatable cam means to thereby vary the spacing between the edges of said shutter curtains, roller means for said curtains coupled to said gear trains for effecting the desired movement of said shutter curtains, and universal pivot means in said roller means for compensating for variations in the distances between the fastening points of the shutter curtains on their roller means.

3. The improvement of a focal plane shutter assembly comprising a focal plane shutter supporting frame, first and second shutter curtains mounted for movement in said frame to provide an exposure function, first rotatable cam means coupled to said first shutter curtain by a cam follower and gear train, second rotatable cam means coupled to said second shutter curtain by a cam follower and gear train, a pair of contra-rotating drive motor and brake-clutch assemblies, said drive motor and clutch-brake assemblies being adapted to be coupled to said gear trains for driving said first and second rotatable cams at the same rotary velocity, said clutch-brake assemblies being selectively actuatable to clutch said drive motors to said gear trains to provide driving power for said rotatable cams and being further selectively actuatable to apply braking force to said rotatable cams for stopping the rotation thereof at the end of an exposure cycle, selectively actuatable differential means coupled to the gear train for said second rotatable cam means to vary the phase relationship between said first and second rotatable cam means to thereby vary the spacing between the edges of said shutter curtains, damping means positioned between said first rotatable cam means and the cam gear for said second rotatable cam means and in frictional contact therewith to improve the accuracy of the exposure function, and roller means for said curtains coupled to said gear trains for effecting the desired movement of said shutter curtains.

4. The improvement of a focal plane shutter assembly comprising a focal plane shutter supporting frame, first and second shutter curtains mounted for movement in said frame to provide an exposure function, first rotatable cam means coupled to said first shutter curtain by a cam follower and gear train, second rotatable cam means coupled to said second shutter curtain by a cam follower and gear train, drive motor means adapted to be coupled to said gear trains for driving said first and second rotatable cams at the same rotary velocity, selectively actuatable differential means coupled to the gear train for said second rotatable cam means to vary the phase relationship between said first and second rotatable cam means to thereby vary the spacing between the edges of said shutter curtains, damping means positioned between said first rotatable cam means and the cam gear for said second rotatable cam means and in frictional contact therewith to improve the accuracy of the exposure function, roller means for said curtains coupled to said gear trains for effecting the desired movement of said shutter curtains, and universal pivot means in said roller means for compensating for variations in the distances between the fastening points of the shutter curtains on their roller means.

5. The improvement of a focal plane shutter assembly comprising a focal plane shutter supporting frame, first and second shutter curtains mounted for movement in said frame to provide an exposure function, first rotatable cam means coupled to said first shutter curtain by a cam follower and gear train, second rotatable cam means coupled to said second shutter curtain by a cam follower and gear train, drive motor means adapted to be coupled to said gear trains for driving said first and second rotatable cams at the same rotary velocity, selectively actuatable differential means coupled to the gear train for said second rotatable cam means to vary the phase relationship between said first and second rotatable cam means to thereby vary the spacing between the edges of said shutter curtains, roller means for said curtains coupled to said gear trains for effecting the desired movement of said shutter curtains, and universal pivot means in said roller means for compensating for variations in the distances between the fastening points of the shutter curtains on their roller means.

6. The improvement of a focal plane shutter assembly comprising a focal plane shutter supporting frame, first and second shutter curtains mounted for movement in said frame to provide an exposure function, first rotatable cam means coupled to said first shutter curtain by a cam follower and gear train, second rotatable cam means coupled to said second shutter curtain by a cam follower and gear train, drive motor means adapted to be coupled to said gear trains for driving said first and second rotatable cams at the same rotary velocity, selectively actuatable differential means coupled to the gear train for said second rotatable cam means to vary the phase relationship between said first and second rotatable cam means to thereby vary the spacing between the edges of said shutter curtains damping means positioned between said first rotatable cam means and the cam gear for said second rotatable cam means and in frictional contact therewith to improve the accuracy of the exposure function, and roller means for said curtains coupled to said gear trains for effecting the desired movement of said shutter curtains.

7. The improvement of a focal plane shutter assembly comprising a focal plane shutter supporting frame, first and second shutter curtains mounted for movement in said frame to provide an exposure function, first rotatable cam means coupled to said first shutter curtain by a cam follower and gear train, second rotatable cam means coupled to said second shutter curtain by a cam follower and gear train, a pair of contrarotating drive motor and brake-clutch assemblies, said drive motor and clutch-brake assemblies being adapted to be coupled to said gear trains for driving said first and second rotatable cams at the same rotary velocity, said clutch-brake assemblies being selectively actuatable to clutch said drive motors to said gear trains to provide the driving power for said rotatable cams and being further selectively actuatable to apply the braking force to said rotatable cams for stopping the rotation thereof at the end of an exposure cycle, selectively actuatable differential means coupled to the gear train for said second rotatable cam means to vary the phase relationship between said first and second rotatable cam means to thereby vary the spacing between the edges of said shutter curtains, and roller means for said curtains coupled to said gear trains for effecting the desired movement of said shutter curtains.

8. The improvement of a high speed focal plane shutter assembly comprising a focal plane shutter supporting frame including a pair of parallel positioned, spaced-apart side plates, first and second shutter curtains mounted for movement between said side plates to provide an exposure function, first rotatable cam means coupled to said first shutter curtain by a cam follower and gear train, second rotatable cam means coupled to said second shutter curtain by a cam follower and gear train, a pair of contra-rotating drive motor and brake-clutch assemblies, each of said motor and clutch-brake assemblies being positioned at a different remote end of said shutter frame between said side plates to enhance the structural rigidity of said frame, said clutch-brake assemblies being selectively actuatable to clutch said drive motors to said gear trains to provide the driving power for said rotatable cams to drive the latter at the same rotary velocity, and being further selectively actuatable to apply the braking force to said rotatable cams for stopping the rotation thereof at the end of an exposure cycle, selectively actuatable differential means coupled to said gear train for said second rotatable cam means to vary the phase relationship between said first and second rotatable cam means to thereby vary the exposure slit spacing between the edges of said shutter curtains, damping means positioned between said first rotatable cam means and the cam gear for said second rotatable cam means and in frictional contact therewith to improve the accuracy of the exposure function, roller means for said curtains coupled to said gear trains for effecting the desired movement of said shutter curtains, and universal pivot means in said roller means for compensating for variations in the distances between the fastening points of the shutter curtains on their roller means.

9. The improvement of a focal plane shutter assembly comprising a focal plane shutter supporting frame, first and second shutter curtains mounted for movement in said frame to provide an exposure function, first rotatable cam means coupled to said first shutter curtain by a cam follower and gear train, second rotatable cam means coupled to said second shutter curtain by a cam follower and gear train, a pair of contra-rotating drive motor and brake-clutch assemblies, said drive motor and clutch-brake assemblies being adapted to be coupled to said gear trains for driving said first and second rotatable cams at the same rotary velocity, said clutch-brake assemblies being selectively actuatable to clutch said drive motors to said gear trains to provide driving power for said rotatable cams and being further selectively actuatable to apply braking force to said rotatable cams for stopping the rotation thereof at the end of an exposure cycle, selectively actuatable differential means coupled to the gear train for said second rotatable cam means to vary the phase relationship between said first and second rotatable cam means to thereby vary the spacing between the edges of said shutter curtains, and damping means positioned between said first rotatable cam means and the cam gear for said second rotatable cam means, said damping means comprising an annular member of high friction material in frictional contact therewith to improve the accuracy of the exposure function.

10. The improvement of a focal plane shutter assembly comprising a focal plane shutter supporting frame, first and second shutter curtains mounted for movement in said frame to provide an exposure function, first rotatable cam means coupled to said first shutter curtain by a cam follower and gear train, second rotatable cam means coupled to said second shutter curtain by a cam follower and gear train, a pair of contra-rotating drive motor and brake-clutch assemblies, said drive motor and clutch-brake assemblies being adapted to be coupled to said gear trains for driving said first and second rotatable cams at the same rotary velocity, said clutch-brake assemblies being selectively actuatable to clutch said drive motors to said gear trains to provide driving power for said rotatable cams and being further selectively actuatable to apply braking force to said rotatable cams for stopping the rotation thereof at the end of an exposure cycle, selectively actuatable differential means coupled to the gear train for said second rotatable cam means to vary the phase relationship between said first and second rotatable cam means to thereby vary the spacing between the edges of said shutter curtains, damping means positioned between said first rotatable cam means and the cam gear for said second rotatable cam means and in frictional contact therewith to improve the accuracy of the exposure function, roller means for said curtains coupled to said gear trains for effecting the desired movement of said shutter curtains, universal pivot means in said roller means for compensating for variations in the distances between the fastening points of the shutter curtains on their roller means and electrical switching means for effecting switching functions in the exposure cycle, said electrical switching means comprising a plurality of switching devices coupled to said rotatable cams for successive actuation in accordance with the rotation of said rotatable cams.

11. The improvement of a focal plane shutter assembly comprising a focal plane shutter supporting frame, first and second shutter curtains mounted for movement in said frame to provide an exposure function, first rotatable cam means coupled to said first shutter curtain by a cam follower and gear train, second rotatable cam means coupled to said second shutter curtain by a cam follower and gear train, a pair of contra-rotating drive motor and brake-clutch assemblies, said drive motor and clutch-brake assemblies being adapted to be coupled to said gear trains for driving said first and second rotatable cams at the same rotary velocity, said clutch-brake assemblies being selectively actuatable to clutch said drive motors to said gear trains to provide driving power for said rotatable cams and being further selectively actuatable to apply braking force to said rotatable cams for stopping the rotation thereof at the end of an exposure cycle, selectively actuatable differential means coupled to the gear train for said second rotatable cam means to vary the phase relationship between said first and second rotatable cam means to thereby vary the spacing between the edges of said shutter curtains, damping means positioned between said first rotatable cam means and the cam gear for said second rotatable cam means and in frictional contact therewith to improve the accuracy of the exposure and electrical switching means coupled to said rotatable cams for synchronous operation therewith, said electrical switching means comprising a plurality of switching devices adapted to be successively actuated for effecting switching functions during the exposure cycle.

12. The improvement of a focal plane shutter assembly comprising a focal plane shutter supporting frame, first and second shutter curtains mounted for movement in said frame to provide an exposure function, first rotatable cam means coupled to said first shutter curtain by a cam follower and gear train, second rotatable cam means coupled to said second shutter curtain by a cam follower and gear train, a pair of contra-rotating drive motor and brake-clutch assemblies, said drive motor and clutch-brake assemblies being adapted to be coupled to said gear trains for driving said first and second rotatable cams at the same rotary velocity, said clutch-brake assemblies being selectively actuatable to clutch said drive motors to said gear trains to provide driving power for said rotatable cams and being further selectively actuatable to apply braking force to said rotatable cams for stopping the rotation thereof at the end of an exposure cycle, selectively actuatable differential means coupled to the gear train for said second rotatable cam means to vary the phase relationship between said first and second rotatable cam means to thereby vary the spacing between the edges of said shutter curtains, and electrical switching means coupled to said rotatable cams for synchronous operation therewith, said electrical switching means comprising cam ring means including a plurality of axially aligned cam rings and a plurality of electrical switching devices adapted to be actuated by associated individual ones of said cam rings for successive actuation to effect a plurality of switching functions during the exposure cycle.

13. The improvement of a focal plane shutter assembly in accordance with claim 12 wherein said electrical switching devices comprise a first switch for exposure braking control, a second switch for shutter operation indication, a third switch for film recycle initiation, a fourth switch for clutch hold control and shutter cycle termination, and a fifth switch for a night stop function.

14. The improvement of a focal plane shutter assembly comprising a focal plane shutter supporting frame, first and second shutter curtains mounted for movement in said frame to provide an exposure function, first rotatable cam means coupled to said first shutter curtain by a cam follower and gear train, second rotatable cam means coupled to said second shutter curtain by a cam follower and gear train, a pair of contra-rotating drive motor and brake-clutch assemblies, said drive motor and clutch-brake assemblies being adapted to be coupled to said gear trains for driving said first and second rotatable cams at the same rotary velocity, said clutch-brake assemblies being selectively actuatable to clutch said drive motors to said gear trains to provide driving power for said rotatable cams and being further selectively actuatable to apply braking force to said rotatable cams for stopping the rotation thereof at the end of an exposure cycle, selectively actuatable differential means coupled to the gear train for said second rotatable cam means to vary the phase relationship between said first and second rotatable cam means to thereby vary the spacing between the edges of said shutter curtains, damping means positioned between said first rotatable cam means and the cam gear for said second rotatable cam means and in frictional contact therewith to improve the accuracy of the exposure function, roller means for said curtains coupled to said gear trains for effecting the desired movement of said shutter curtains, and universal pivot means in said roller means for compensating for variations in the distances between the fastening points of the shutter curtains on said roller means, said universal pivot means comprising a T-shaped coupling member having a shank portion pivotally positioned in the shaft of said roller means and a head portion adapted to be fitted in coupling engagement with the roller sleeve portions of said roller means to permit compensating pivotal motion between said roller sleeve portions.

15. The improvement of a focal plane shutter assembly comprising a focal plane shutter supporting frame, first and second shutter curtains mounted for movement in said frame to provide an exposure function, each of said shutter curtains comprising a slit defining edge having reinforcement means extending thereacross, said reinforcement means including a plurality of elongated tubular members positioned in parallel relation and a stainless steel strip positioned parallel to but spaced from said tubular members, first rotatable cam means coupled to said first shutter curtain by a cam follower and gear train, second rotatable cam means coupled to said second shutter curtain by a cam follower and gear train, a pair of contra-rotating drive motor and brake-clutch assemblies, said drive motor and clutch-brake assemblies being adapted to be coupled to said gear trains for driving said first and second rotatable cams at the same rotary velocity, said clutch-brake assemblies being selectively actuatable to clutch said drive motors to said gear trains to provide driving power for said rotatable cams and being further selectively actuatable to apply braking force to said rotatable cams for stopping the rotation thereof at the end of an exposure cycle, and selectively actuatable differential means coupled to the gear train for said second rotatable cam means to vary the phase relationship between said first and second rotatable cam means to thereby vary the spacing between the edges of said shutter curtains.

16. The improvement of a focal plane shutter assembly comprising a focal plane shutter supporting frame, first and second shutter curtains mounted for movement in said frame to provide an exposure function, each of said shutter curtains comprising a slit defining edge having reinforcement means extending thereacross, first rotatable cam means coupled to said first shutter curtain by a cam follower and gear train, second rotatable cam means coupled to said second shutter curtain by a cam follower and gear train, a pair of contra-rotating drive motor and brake-clutch assemblies, said drive motor and clutch-brake assemblies being adapted to be coupled to said gear trains for driving said first and second rotatable cams at the same rotary velocity, said clutch-brake assemblies being selectively actuatable to clutch said drive motors to said gear trains to provide driving power for said rotatable cams and being further selectively actuatable to apply braking force to said rotatable cams for stopping the rotation thereof at the end of an exposure cycle, selectively actuatable differential means coupled to the gear train for said second rotatable cam means to vary the phase relationship between said first and second rotatable cam means to thereby vary the spacing between the edges of said shutter curtains, damping means positioned between said first rotatable cam means and the cam gear for said second rotatable cam means and in frictional contact therewith to improve the accuracy of the exposure function, roller means for said curtains coupled to said gear trains for effecting the desired movement of said shutter curtains, and universal pivot means in said roller means for compensating for variations in the distances between the fastening points of the shutter curtains on their roller means.

References Cited in the file of this patent

UNITED STATES PATENTS

| | | |
|---|---|---|
| 714,106 | Garfield | Nov. 18, 1902 |
| 2,134,766 | Schieber et al. | Nov. 1, 1938 |
| 2,186,614 | Mihalyi | Jan. 9, 1940 |
| 2,446,638 | Crumrine | Aug. 10, 1948 |